United States Patent
Beers

[11] 3,756,635
[45] Sept. 4, 1973

[54] IMPROVED APPARATUS FOR FORMING DOWEL-TYPE JOINTS

[76] Inventor: Howard L. Beers, 1 North 403 Gray Ave., P.O. Box 684, Wheaton, Ill.

[22] Filed: Feb. 17, 1971

[21] Appl. No.: 116,138

[52] U.S. Cl. .................. 287/127 R, 287/20.92 E
[51] Int. Cl. ............................................. F16b 13/00
[58] Field of Search ............... 287/127 R, 20.92 E

[56] References Cited
UNITED STATES PATENTS

| | | | |
|---|---|---|---|
| 2,690,879 | 10/1954 | Snyder | 85/63 |
| 1,726,362 | 8/1929 | Orsenigo | 287/20.92 E |
| 2,817,620 | 12/1957 | Golick et al. | 287/20.92 E X |

FOREIGN PATENTS OR APPLICATIONS

| | | | |
|---|---|---|---|
| 153,730 | 3/1956 | Sweden | 287/20.92 E |

*Primary Examiner*—Andrew V. Kundrat
*Attorney*—Wolfe, Hubbard, Leydig, Voit & Osann

[57] ABSTRACT

Improved apparatus for forming dowel-type joints characterized by a tight frictional contact and a generally evenly distributed adhesive layer between the male-female interface wherein a predetermined amount of adhesive is discharged near the bottom or inner end of the female member from a containing medium as the male member is seated therein to be forced by the increased hydrostatic pressure existing at that time over the interface area. The containing medium may be an encapsulating shell which ruptures under the pressure applied thereto as the male member is seated, or the male member may itself contain the adhesive and act as a positive displacement pump as it is seated.

10 Claims, 6 Drawing Figures

INVENTOR.
HOWARD L. BEERS,
BY
Wolfe, Hubbard, Leydig, Voit & Osann
ATTORNEYS.

IMPROVED APPARATUS FOR FORMING DOWEL-TYPE JOINTS

BACKGROUND OF THE INVENTION

This invention relates to the formation of dowel-type joints, and more particularly to improved apparatus for adhesively bonding the male and female members of such a joint.

There are a variety of joints in general use for securing separately fabricated parts, such as the components of a piece of furniture, usually without the use of nails, screws, bolts or the like. For example, there are tongue and groove joints, mortise and tenon joints, and modifications of both of those. However, the joint which can be formed with the least tooling and machining and which, if properly formed, is the most durable is the well known dowel joint.

The proper formation of a dowel joint demands among other things, a tight press fit between the male member or dowel pin and the sidewalls of a complimentarily configured female member or dowel hole for strong frictional or mechanical bonding, together with a substantially evenly distributed layer of adhesive between the pin and the sidewalls of the hole for strong chemical bonding. Heretofore, a great deal of difficulty has been encountered in attempting to simultaneously satisfy these criteria. For instance, if the most common practice is followed of spreading the adhesive along the length of the pin prior to inserting it, a tight frictional contact between the sidewalls of the hole and the outer surface of the pin generally defeats the attempt to form an evenly distributed adhesive layer. Indeed, after the dowel pin has been inserted, there is frequently an unsightly build up of an adhesive residue around the lip of the hole which must in some instances, say in the manufacture of quality furniture, be removed.

It is known that the aforementioned problems can be overcome by depositing a predetermined amount of adhesive in the bottom of the hole prior to the insertion of the pin such that the adhesive is displaced as the pin is inserted to flow between the pin and the sidewalls of the hole, thereby providing a generally even adhesive layer without the build up of a surface residue. To that end, injection equipment and the like has been used to dispense the adhesive. However, there are inherent limitations attendant to the use of such equipment, including a requirement that the parts be oriented so that the adhesive is not drawn out of the hole by gravity prior to the insertion of the pin and the necessity of taking care to prevent the equipment from beccomming clogged with dried or cured adhesive. Moreover, injection equipment is generally quite costly, such that its use can be economically justified by only a few of the many manufacturers and assemblers who employ dowel type-joints.

SUMMARY OF THE INVENTION

It is a primary object of this invention to provide improved apparatus for applying adhesive to dowel-type joints. A more detailed related object is to provide apparatus for ensuring a substantially evenly distributed coating of adhesive over the interface between the male and female members of such a joint, regardless of their orientation during the assembly of the joint. Another more detailed related object is to provide economical apparatus for dispensing a measured amount of adhesive into the female member of a dowel-type joint for subsequent distribution as the male member is seated.

More particularly, it is an object of the present invention to provide apparatus of the foregoing type whereby the adhesive tends to flow only under the increased hydrostatic pressure conditions that exist as the male member is seated. A more specific object is to provide apparatus of the foregoing type whereby the adhesive is dispensed into the female member in a confined state and then discharged near the bottom or inner end of the female member to be squeezed outwardly over the interface as a result of the pressure applied thereto as the male member is seated. In accordance with one aspect of this invention, a detailed related object is to provide apparatus whereby an encapsulated adhesive is dispensed into the female member such that it is discharged to flow only when the pressure attendant to the seating of the male member reaches the rupture pressure of the encapsulating medium. In accordance with another aspect of the invention, a further detailed related object is to provide an apparatus whereby the adhesive is contained by the male member and discharged therefrom toward the inner end of the female member by a positive displacement type pump action which takes place as the male member is seated.

A further object of the present invention is to provide apparatus of the foregoing types which are suitable for use with the known and new adhesives employed to adhesively bond the members of dowel-type joints, including single or multiple component adhesives cured by exposure to air, heat, or catalytic agents.

Still another object of the present invention is to provide apparatus of the foregoing type which may be used by even relatively unskilled personnel to form quality dowel joints. Moreover, it is an object of this invention to provide apparatus of the foregoing type which are suitable for use in the formation of dowel-type joints on a high speed production basis, but which do not rely for their economic justification on high production rates.

BRIEF DESCRIPTION OF THE DRAWINGS

Other objects and advantages of this invention will become apparent when the following detailed description is read in conjunction with the attached drawings, in which.

DETAILED DESCRIPTION OF THE ILLUSTRATED EMBODIMENT

While the invention will be described in detail hereinafter with reference to certain illustrated embodiments, it is to be understood that the intent is not to limit it to those embodiments. To the contrary, the intent is to cover all modifications, alternatives and equivalents that are within the spirit and scope of the invention as defined by the appended claims.

To form a dowel-type joint in accordance with the present invention, the adhesive is confined until the male member or pin of the joint is inserted into the female member or hole, at which time the adhesive is discharged to flow under the hydrostatic pressure which is developed as the male member is seated to form a substantially evenly distributed adhesive layer or coating over the interface area between the male and female members. The male and female members are complimentarily configured and dimensioned such that there is substantial frictional contact between them throughout the interface area. Consequently, the chemical and mechanical bonding strengths of the completed joint are on the order of those that have been routinely obtainable heretofore only by the use of the aforementioned adhesive injection equipment or the like. There is, however, no limitation on the orientation of the parts during or following the formation of the joint because there is sufficient contact between the male and female members even before the adhesive is discharged to effectively plug the joint against having the adhesive drawn out by gravity. Moreover, the present invention permits quality dowel joints to be routinely formed without the use of expensive or complex equipment which is subject to becoming clogged with cured or dried adhesive. Preferably, in keeping with the practice that has been followed in using adhesive injection equipment, the amount of adhesive discharged into the joint is selected to provide the desired adhesive coating throughout substantially the entire interface area, without causing any significant build up of surface residue.

Figure 1:
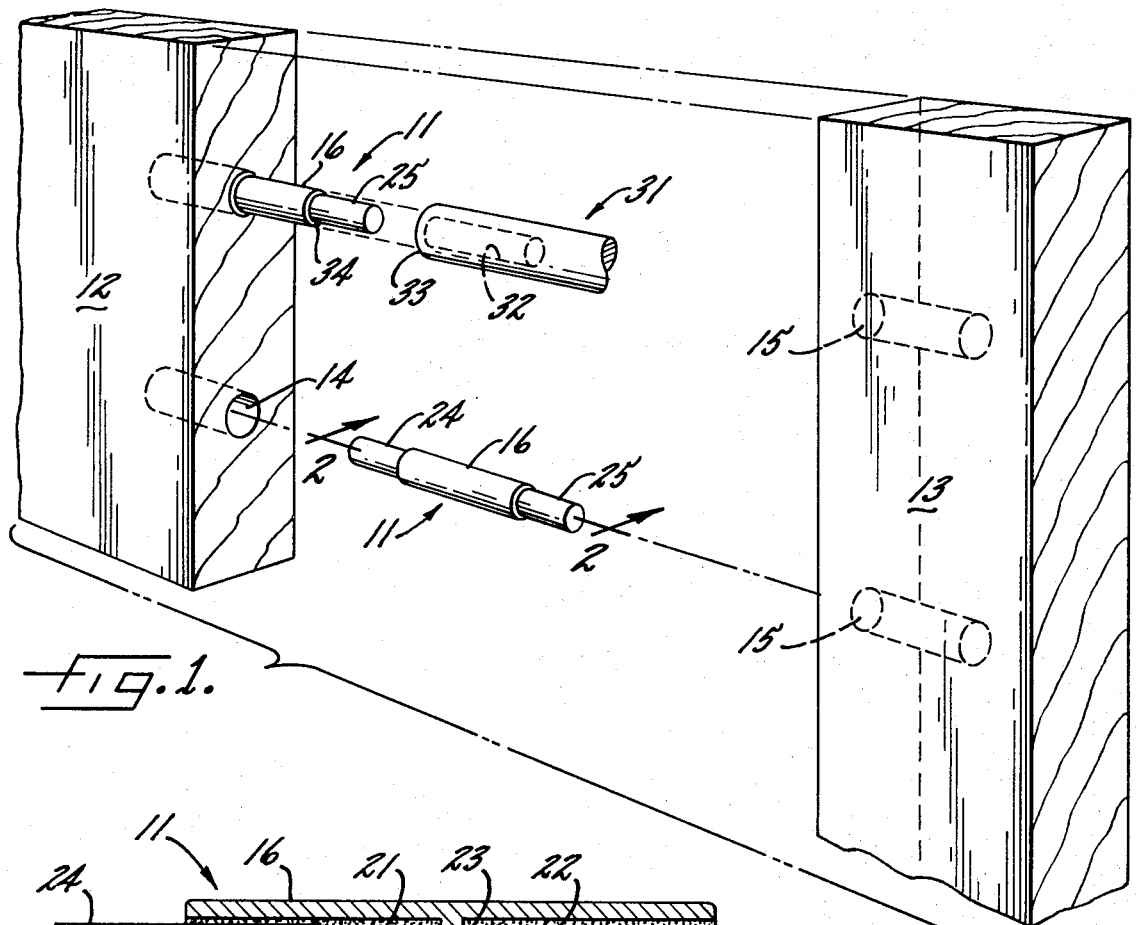
FIG. 1 is an exploded perspective view of a pair of double ended dowel pins constructed in accordance with the present invention, together with a typical environment and a tool which may be used in those situations wherein only one end of the dowel pin is to be seated.
Figure 2:
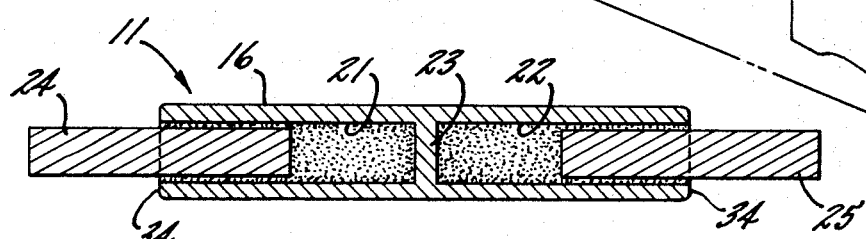
FIG. 2 is a section taken along the longitudinal axis of one of the dowel pins shown in FIG. 1 to illustrate its initial condition prior to being seated.
Figure 3:
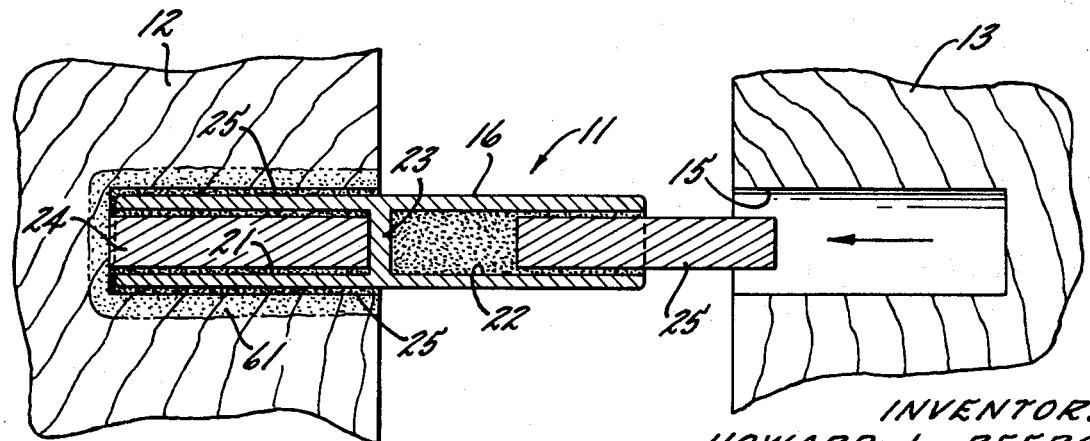
FIG. 3 is another section taken along the longitudinal axis of the dowel pin shown in FIG. 1 to illustrate its condition after insertion of one end, together with the adhesive impregnation which takes place when a dowel-type joint is properly formed in a permeable material, such as wood.
Figure 4:
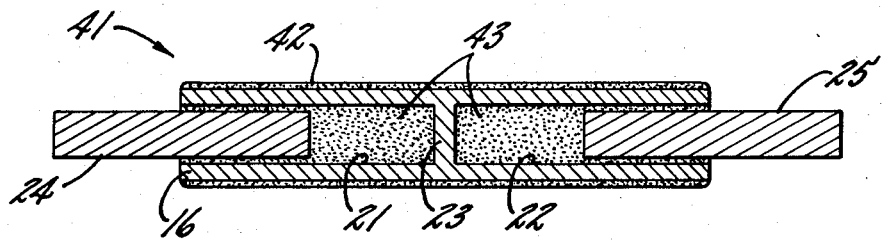
FIG. 4 is a longitudinal section of a modified double ended dowel pin embodying the present invention.

With the foregoing in mind, attention is directed to FIGS. 1-3 wherein there is shown a double ended dowel pin 11 such as may be used in accordance with the present invention to form a concealed dowel-type joint between two parts 12 and 13. For illustrative purposes, wooden parts with circular cross-section dowel holes 14 and 15 have been indicated, but it is to be understood that no limitation is to be implied therefrom. Indeed, the present invention may be used to advantage in forming dowel joints in any and all of the materials or combination of materials within which dowel joints may be formed by conventional techniques. The dowel holes 14 and 15, on the other hand, have been shown as having circular cross-sections simply to compliment the cylindrical configuration of the outer surface of the body portion 16 of the illustrated dowel pin. As a result, it will be seen that when the parts 12 and 13 are joined, the desired frictional contact exists along the interfaces which are respectively defined between the sidewalls of the holes 14 and 15 and the outer surface of the dowel pin body portion 16.

To carry out the present invention, the dowel pin 11 comprises a pair of back-to-back internal chambers or cylinders 21 and 22 which are closed at their inner ends by a separator 23 to define respective adhesive reservoirs. Slidably mounted in the cylinders 21 and 22 there are respective displacement means or pistons 24 and 25. There are interference fits between the sidewalls of the cylinders 21 and 22 and their respective pistons 24 and 25 so as to prevent any of the adhesive from flowing out of the cylinders, except under the increased hydrostatic pressures that are applied thereto as the pistons are driven toward the inner ends of their respective cylinders. In other words, the cylinder and piston combinations 21, 24 and 22, 25 act as positive displacement pumps.

To prevent gravity from drawing the adhesive out of the joint, the pistons 24 and 25 are actuated only after the joint has been plugged by interference fits made between the sidewalls of the holes 14 and 15 and the outer surface of the dowel pin body portion 16. To that end, the outer ends of the pistons 24 and 25 initially extend from the opposite ends of the body portion 16 distances which are short relative to the depths of the respective dowel holes 14 and 15. Hence, they bottom against the inner ends of the dowel holes only after substantial lengths of the outer surface of the body portion 16 are in contact with the sidewalls of the respective dowel holes. Thereafter, as the dowel pin is seated, the pistons 24 and 25 are driven toward the inner ends of their respective cylinders 21 and 22 to increase the hydrostatic pressure on the adhesive to the point that it is forced out of the cylinders and discharged toward the inner ends of the dowel holes to be squeezed outwardly, thereby forming the desired generally evenly distributed adhesive layer or coating 25 over the interfaces between the sidewalls of the dowel holes 14 and 15 and the outer surface of the dowel pin body portion 16.

Commonly, the pistons 24 and 25 are substantially simultaneously actuated by placing the opposite ends of the dowel pin 11 in the dowel holes 14 and 15 and then pressing the parts 12 and 13 together. They may, however, be separately actuated, such as by using the tool 31 shown in FIG. 1 for seating one end of the dowel pin without actuating the piston at the opposite end. As will be seen, the tool has a recess 32 for receiving the extended length of either one of the pistons 24 and 25 and a face 33 which surrounds the recess 32 to engage a collar 34 defined at either end of the body portion 16.

As will be appreciated, the dowel pin 11 may be fabricated from any number of materials. Thus, the materials may be selected on the basis of their desired shear and tensile strength characteristics, together with the cost considerations.

Likewise a variety of adhesives may be suitably employed. For instance, provision (not shown) may be made to hermetically seal the cylinders 21 and 22 until their respective pistons are actuated so as to permit the use of an air cured adhesive. Or, a variety of other types of single component adhesives, such as heat cured adhesives, might be employed. Also, multi-component, chemically cured adhesives, such as the epoxy resins, may be utilized by separately encapsulating or isolating the resin and catalyst members thereof in membranes or shells which rupture under the hydrostatic pressures developed while the dowel pin is seated. For procedures that may be used in the encapsulating process, reference is hereby made to Green et al. U.S. Pat. No. 2,800,457; Brynko et al. U.S. Pat. No. 3,190,837; Brynko et al. U.S. Pat. No. 3,341,466; Green U.S. Pat. No. Re. 24,899; "Capsules Capture New Markets," *Chemical Week*, Dec. 21, 1963, pp. 43 et seq.; Herbiz, "Microencapsulation," *Encyclopedia of Chemical Technology*, Vol. 13; John Wiley & Sons 1967 (Second Edition), pp. 436 et seq.; and Huber et al., "Capsular Adhesives," *Tappi*, Vol. 49 No. 5, May 1966, pp. 41A et seq. Further, one encapsulated adhesive which has been found to be acceptable for many purposes is identified by the manufacturer, The National Cash Register Company, Dayton, Ohio, as "RDH-035 Encapsulated Adhesive PEF 312," which is believed to be a polyester/epoxy capsular adhesive having capsules ranging between about 500 and 800 microns in size, a polyethylene-vinyl acetate copolymer shell or wall material, and comprising 90 percent adhesive by weight. Another is identified by the same manufacturer as IPP 536, which is believed to be a polyester adhesive having capsules ranging between about 500-800 microns in size and including a curing catalyst coated on the exterior walls of the capsules. However, it is to be understood that a variety of hydrophillic adhesives, including polyesters, polyamides, and epoxys, may be encapsulated using wall or shell membrane materials such as gelatin, polyvinyl alcohol, hydroxy ethyl cellulose, or methyl cellulose.

Various modifications may, of course, be made to the dowel pin without departing from the present invention. For example, one of the simplest modifications, which may be used to advantage in conjunction with adhesives such as epoxy resins, involves providing a dowel pin 41 which has a catalyst 42 deposited in a thin film layer along the length of its body portion and a resin 43 stored within its chambers or cylinders. The general construction of the dowel pin 41 is identical to that of the dowel pin 11. Thus, instead of repeating the foregoing description, the same reference numerals as used in describing the dowel pin 11 have been used to identify the corresponding parts of the dowel pin 41.

Figure 6:
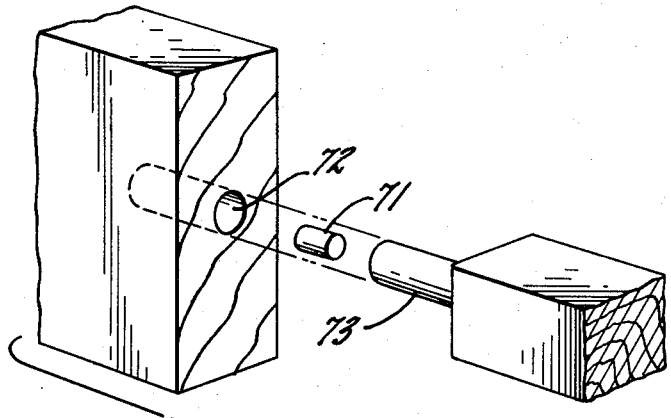
FIG. 6 is an exploded perspective view illustrating the use of a slug of encapsulated adhesive to carry out the invention.

A slightly more sophisticated modification, which may also be used to advantage with multi-component adhesives such as epoxy resins, is illustrated by the dowel pin 51 shown in FIG. 6. As will be seen, the dowel pin 51 comprises back-to-back chambers or cylinders 52 and 53 which are defined internally of the body portion 16 and closed at their inner ends by the separator 23. Slidably mounted within the cylinders 52 and 53 and having an interference fit therewith there are respective displacement means or pistons 54 and 55. The pistons 54 and 55 again initially extend outwardly beyond the opposite ends of the body portion 16, but in this instance they are hollowed out and have open inner ends to define respective cylinders 56 and 57. The cylinders 56 and 57 are, in turn, slidably mounted on and make interference fits with further displacement means or pistons 58 and 59 which are fixed to the separator 23 and extend to the opposite ends of the dowel pin body portion 16. As will be seen, the cylinders 52, 53, 56 and 57 are initially isolated from one another in that fluid communication exists between the cylinders 52 and 56 and the cylinders 53 and 57 only when the pistons 54 and 55 are driven inwardly to increase the hydrostatic pressure on their contents. Thus, the components of a multi-component adhesive may be separately stored, say a resin in the cylinders 52 and 53 and a catalyst in the cylinders 56 and 57, for mixing as the respective ends of the dowel pin are seated.

As will be appreciated, the most notable distinction between the operation of the modified dowel pins 41 and 51 is that with the dowel pin 41 the mixing of the adhesive components takes place externally, whereas with the dowel pin 51 the mixing takes place, at least partially, internally.

Figure 5:
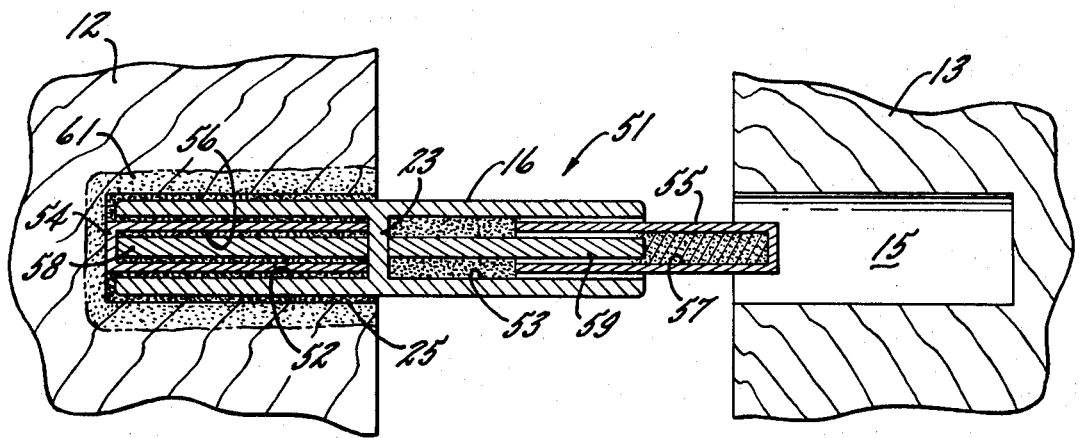
FIG. 5 is a longitudinal section of another modified double ended dowel pin embodying the present invention.

It is to be understood that any one of the dowel pins 11, 41 and 51 may be used with an encapsulated adhesive as above described. It is noteworthy that each of them, by virtue of the limited clearances they provide for discharging adhesive, effectively filters the adhesive from the encapsulating wall material. There is, therefore, little risk of the wall material contaminating or degrading the chemical or adhesive bond provided in forming the dowel joint. It is also noteworthy, that by ensuring a generally evenly distributed adhesive coating or layer 25, together with substantial frictional contact throughout the male-female interface area, each of the dowel pins 11, 41 and 51 causes the generally uniform impregnation of adhesive into the area 61 (FIGS. 3 and 5) surrounding the joint which has been found to be characteristic of a dowel-type joint of superior strength in wood and other parts having significant permeabilities.

The method of forming a dowel joint that is provided by the present invention can be readily carried out by the novel dowel pins discussed hereinabove, but is not wholly dependent thereon. For instance, as shown in FIG. 6, to avoid the use of a special dowel pin, a separate slug 71 of encapsulated adhesive may be manually or mechanically inserted in a dowel hole or female member 72 for discharge after the joint has been plugged by the rupture pressure applied to the encapsulating shell or wall material as the male member 73 is seated. The slug 71 may comprise a single, shaped capsule of adhesive, or more practically in the present state of the encapsulation art, a plurality of adhesive containing microcapsules bound together in a predetermined configuration, such as by a molding process. The configuration of the slug 71 is not particularly critical, since mirror irregularities in the distribution of the adhesive that may exist at the time the wall material ruptures will tend to disappear, so long as the dowel hole 72 and dowel pin 73 have complimentary configurations. The limited clearance permitted to ensure that the desired frictional contact between the dowel hole 72 and the dowel hole 73 again provides a mechanical filtering action which separates the adhesive from the wall material, such that the adhesive is displaced as the male member or pin 73 is seated for distribution over the male-female interface area, while the wall material is trapped at the bottom or inner end of the joint.

CONCLUSION

In view of the foregoing, it will now be appreciated that the present invention provides new and improved apparatus for forming high quality dowel-type joints independently of the orientation of the parts to be joined and without the use of expensive and complex equipment. In other words the invention makes it possible to plan an assembly involving dowel-type joints from the standpoint of efficiency and convenience, rather than from the standpoint of maintaining any critical orientation of the parts during the formation of the joint. Moreover, the invention enables quality dowel-type joints to be formed even by those who have found the equipment that has been previously required for that purpose to be economically prohibitive or otherwise not feasible.

I claim as my invention:

1. For use in forming dowel-type joints in a part having a preformed dowel hole defined by sidewalls and an inner end, a dowel pin comprising the combination of a body portion having an outer surface configured such that when said pin is seated in said hole there is frictional contact between the outer surface of said body portion and the sidewalls of said hole over a substantial portion of the interface defined therebetween, said outer surface having a first component of a multi-component adhesive system coated thereon, an internal reservoir in said body portion holding a second component of said adhesive system, a path for fluid communication between said reservoir and said outer surface of said body portion, displacement means slidably mounted in said reservoir, and actuating means extending beyond said body portion and fixed to said displacement means, whereby said actuating means causes relative movement between said displacement means and said reservoir as said pin is seated in said hole, such that said second component of said adhesive system is forced from said reservoir for distribution and contact with said first component of adhesive over said outer surface.

2. The dowel pin of claim 1 wherein said displacement means is disposed in said path and is effective to prevent adhesive from being drawn from said reservoir by gravity.

3. The dowel pin of claim 2 wherein said actuating means is integral with said displacement means.

4. The dowel pin of claim 3 wherein said actuating means extends beyond the body portion of said pin a distance which is short relative to a predetermined depth of said dowel hole, whereby said actuating means bottoms against the inner end of said dowel hole only after a portion of said body portion is in contact with said sidewalls, whereby said joint is plugged prior to the adhesive being forced from said reservoir such that adhesive is prevented from being drawn out of said joint by gravity.

5. An adhesive containing dowel pin for use in forming dowel-type joints, said pin comprising:
a body portion having its outer surface coated with one component of a multi-component adhesive;
a reservoir defined internally of said body portion containing a second component of adhesive;
a path for fluid communication between said reservoir and one end of said body portion; and,
a displacement means disposed in said path and slidable within the reservoir;
whereby said components mix only after said second component has been displaced from said reservoir responsive to said dowel pin being inserted into a dowel hole, the bottom of which contacts said displacement means and drives it into said reservoir while said dowel pin is being inserted into said hole.

6. The adhesive containing dowel pin of claim 5 wherein said displacement means has an interference fit with said reservoir to thereby prevent adhesive from being drawn from said reservoir by gravity.

7. The adhesive containing dowel pin of claim 6 wherein said displacement means initially extends beyond said one end of said body portion so as to be advanced into said reservoir as said dowel pin is seated within a dowel hole by bottoming against an inner end of said dowel hole.

8. The adhesive dowel pin of claim 5 wherein the adhesive contained by said reservoir is encapsulated by a wall material which ruptures as said displacement means is advanced into said reservoir, and said displacement means provides only a limited clearance for flow through said path whereby said adhesive is substantially filtered from said wall material as said adhesive is displaced from said reservoir.

9. An adhesive containing dowel pin for use in forming dowel-type joints, said dowel pin comprising the combination:
a body portion;
a reservoir defined internally of said body portion and containing a first component of an adhesive system;
a path for fluid communication between said reservoir and one end of said body portion;
a displacement means disposed in said path and slidable within said reservoir;
whereby said first component of said adhesive system is displaced from said reservoir via said path as said displacement means is advanced into said reservoir;
said displacement means including a second reservoir defined internally thereof and containing a second component of adhesive;
a second path for fluid communication between said reservoirs;
a second displacement means disposed in said first reservoir and second path, said second displacement means being slidable within said second reservoir whereby said second component of adhesive is displaced therefrom into said first reservoir as both of said displacement means are advanced.

10. An adhesive containing dowel pin as defined in claim 9 wherein said second displacement means is affixed to said body portion at the bottom of said first reservoir.

* * * * *